United States Patent Office 3,081,236
Patented Mar. 12, 1963

3,081,236
METHOD OF RECOVERING UROKINASE FROM URINE
John Doczi, Morristown, N.J., assignor to Warner-Lambert Pharmaceutical Company, Morris Plains, N.J., a corporation of Delaware
No Drawing. Apr. 26, 1961, Ser. No. 105,542
10 Claims. (Cl. 195—66)

The present invention relates to a method for the recovery of urokinase from urine and relates more particularly to a new and novel method for effecting such recovery which is characterized by its relative simplicity and by its ready adaptability to commercial scale operation.

The blood clotting mechanism is known to involve the interaction of a number of essential factors. At an intermediate stage of clot formation, prothrombin is converted to thrombin in the presence of thromboplastin calcium and accessory factors. The clot itself is formed when the globulin fibrinogen is converted to fibrin in the presence of the thrombin. In the normal individual, the fluidity of blood is maintained by an equilibrium between clot formation and clot lysis. In some individuals and under some circumstances the natural mechanisms of clot lysis may be deficient, necessitating the use of anticoagulants. One of the elements taking part in clot lysis is present in blood in the form of a normally inactive factor called profibrinolysin or plasminogen which, when activated, form fibrinolysin or plasmin which acts upon the proteinaceous fibrin to break it down, thereby lysing the clot. The activation of plasminogen to form the active plasmin has obvious advantages because of its effect upon clot lysis and its consequent value in connection with its application to anticoagulant therapy. Such an activator for plasmiongen has been found in the urine of mammals.

The specific activator present in the urine of mammals has been named urokinase and considerable effort has been directed in recent years toward devising procedures for separating urokinase from urine. The magnitude of the problem of recovering urokinase is borne out by the fact that it is present in only milligram quantities per liter of urine, with a result that extremely large volumes of urine must be processed to insure the production of any sizable quantity of urokinase. The various procedures developed by workers in this field, while useful on a laboratory scale, have certain disadvantages which preclude their use in an economical commercial scale process.

One such prior art method involves the adsorption of urokinase on silica gel by passing urine under pressure through chromatography columns followed by elution with ammonia. Adsorption rates are generally low with a result that commercial operation of such a process would require extremely large columns operated at low throughputs, these factors combining to result in prohibitive manufacturing costs.

Other prior art procedures involve the precipitation of urokinase from urine by either adjustment of the pH to about 4.5 or by the addition of heavy metal cations such as zinc, cadmium, mercury or lead. While the urokinase activity in the input urine is concentrated in the precipitate which forms by either of these methods, it has been observed that the precipitate tends to be colloidal in nature and may be separated only by prolonged centrifugation. The disadvantages of prolonged centrifugation of the large volumes of urine required in commercial production of urokinase are apparent, due both to the relatively high cost of centrifuges having even a moderate capacity and the high operating labor requirements. There has, therefore, long been a need for an efficient method for recovering urokinase from urine which may be carried out on a commercial scale without the use of special or costly equipment.

It is a primary object of this invention to provide an efficient method of recovering urokinase from urine. A further object of this invention is to provide a method of purifying crude urokinase precipitated from urine to obtain a product which is effective in activating plasminogen to dissolve blood clots.

Other objects and the advantages of this invention will become apparent from the following detailed description.

I have now found that the above mentioned objects are realized by precipitating urokinase from mammalian urine as a complex with a phosphorylated carbohydrate and an alkaloid of the cinchona or styrchnine group, followed by regeneration of urokinase from the complex by the treatment thereof with hydrochloric acid and acetone. The urokinase-phosphorylated carbohydrate-alkaloid complex forms a rapidly settling precipitate which contains a substantial percentage of the urokinase activity present in the input urine. As much as 95 percent of the urokinase-free urine may be separated by decantation, thus avoiding the necessity of centrifuging extremely large volumes of urine as required in certain of the prior art processes. I have also found that the complex prepared as described above may be purified prior to regeneration by suspending the complex in aqueous ethanol and precipitating a purified complex therefrom by the addition of ether. The urokinase product obtained after regeneration from the complex constitutes a urokinase which is highly effective in the activation of plasminogen in order to dissolve blood clots.

The separation of urokinase from urine in accordance with my invention is based upon the discovery that the addition of both a water soluble salt of specific alkaloids and a phosphorylated carbohydrate to urine at a pH of about 4.5 to about 6.5 results in the formation of a complex and the precipitation of a substantial percentage of the urokinase activity in the form of this complex. While my process may be applied directly to fresh urine, it is generally preferred that the urine be subjected to an initial treatment comprising the adjustment of its pH to between 7.5 and 10, a step which serves to remove inactive salts, essentially calcium phosphate. This initial preferred pH adjustment step is carried out by the addition of aqueous alkali, for example sodium or potassium hydroxide, until the mixture attains the desired pH of between 7.5 and 10. The resulting suspension is allowed to settle and the clear liquid separated by decantation, followed by centrifugation of the residue. The temperature of the urine during this treatment should be maintained below about 10° C.

The pH of urine, either as collected or after the optional initial treatment described above, is then adjusted to about 4.5 to about 6.5 by the addition of an aqueous mineral acid, for example hydrochloric acid and then a water soluble alkaloid salt and a phosphorylated carbohydrate are added. At least 0.3 percent, and preferably about 0.5 percent, by weight of the urine of the water soluble alkaloid salt and at least 0.2 percent, and preferably about 0.3 percent, by weight of the urine of the phosphorylated carbohydrate are added.

Useful alkaloids are those of the cinchona group, for example cinchonine, quinine and cupreine and those of the strychnine group, for example strychnine and brucine. The alkaloids are used in my process in the form of their water soluble salts, for example the hydrochloride, nitrate, citrate and the like. I have found that quinine in the form of its hydrochloride salt is a particularly effective alkaloid for use in my invention.

Various carbohydrates may be phosphorylated by methods well-known in the art, for example glucose, fructose, galactose, maltose, sucrose, raffinose and the like. The phosphorylated derivatives of non-reducing di- and tri-saccharides, for example sucrose and raffinose, are preferred as complex forming agents for use in my invention. Phosphorylated carbohydrates may be conveniently prepared by reacting a carbohydrate in pyridine solution with an excess of phosphorous oxychloride, followed by recovery of the phosphorylated carbohydrate from the reaction mixture.

Since alkaloids and phosphorylated carbohydrates of the type described above not only have been found to react with urokinase but also to react with each other to form a complex, it is essential that these two ingredients be added separately to the acidified urine in carrying out my improved process. It has been found that best results are obtained by, first, adding the water soluble alkaloid salt, followed by the addition of the phosphorylated carbohydrate. The resulting mixture is stirred at a temperature of less than 10° C. until it attains uniformity and is then allowed to stand for a sufficient time to permit a clear separation of the urokinase-alkaloid-phosphorylated carbohydrate complex which forms as a precipitate.

The precipitated complex has excellent flocculation properties which enable it to settle to the bottom of the vessel in which the precipitation is carried out. It is possible to decant from the settled precipitate a clear supernatant liquid substantially free from urokinase activity and having a volume of as much as 95 percent of the volume of the input urine. During the settling and the decantation operation, the temperature of the mixture is maintained at less than 10° C.

Following the decantation of the clear supernatant liquid, the remaining suspension containing 95 percent or more of the urokinase activity of the input urine and having a solids content of between 5 and 10 percent is centrifuged to separate the complex from the remainder of the inactive liquid. The precipitate is then washed, preferably with an aqueous solution of a water soluble alkaloid salt of the same type used in the precipitation, and is stored at low temperatures, 0° C. or less, pending subsequent processing.

It has been found that an aqueous alkaloid salt solution at a concentration of 0.5 to 2.5 percent by weight is a particularly desirable solution for washing the complex since there is no significant activity loss during the washing operation. If water, sodium chloride or phosphorylated carbohydrate solutions are used, it is found that the precipitate is peptized with resulting loss in activity. Where more concentrated aqueous alkaloid salt solutions are used, it is observed that urokinase dissolves in the wash solution, again with an undesirable activity loss.

The precipitate formed constitutes a complex of urokinase with the alkaloid and the phosphorylated carbohydrate used. Urokinase may be regenerated from this complex by treatment with concentrated hydrochloric acid and acetone in the manner to be described hereinafter. I have found that significant purification is possible by subjecting the precipitate to a solvent fractionation treatment prior to regeneration and accordingly it is generally preferred that the complex be subjected to this preliminary purification step prior to regeneration.

The purification of the complex by solvent fractionation is based upon the discovery that when the complex is dispersed in aqueous ethanol and ether is then added to this dispersion, the precipitate which forms constitutes a urokinase-alkaloid-phosphorylated carbohydrate complex of markedly greater urokinase potency than that of the input complex. The complex is initially dispersed at a temperature of less than 10° C. in an aqueous ethanol solution containing about 65 to about 80 percent ethanol by volume. A 75 percent by volume aqueous ethanol solution has been found to be particularly effective. When the ethanol concentration is too low a separate liquid phase forms upon the addition of ether which complicates the recovery of the precipitate, as well as being detrimental to optimum recovery and purification. Where the ethanol concentration is to high, the degree of purification obtained after the addition of ether is low.

Ether is then added to the resulting dispersion of the complex in aqueous ethanol. About 0.5 to about 2 volumes of ether per volume of the complex dispersion are normally used with about one volume of ether per volume of complex dispersion being preferred. The mixture is maintained at a temperature of less than 10° C. during the addition of ether and is subjected to vigorous agitation. At the conclusion of the addition of the ether, the mixture is allowed to stand at a temperature of 10° C. or less to permit the precipitate which forms to settle. The bulk of the liquid phase is removed by decantation and the suspension remaining is centrifuged. The solids are then washed, preferably with a solution comprising 0.5 to 2.5 percent by weight of the same water soluble alkaloid salt used in the previous precipitation step in a solvent system comprising water, ethanol and ether in the same proportions as are present in the fractionation mixture after the addition of ether.

It has been found that the complex is purified to a substantial degree during the solvent fractionation step. The complex formed during the precipitation step normally has a urokinase potency of between 300 and 500 urokinase units per milligram of protein nitrogen. The complex obtained as a product of the solvent fractionation step has an activity as high as 1400 urokinase units per milligram of protein nitrogen, indicating purification of up to 4.5 fold. In addition, activity yields at this stage are in the order of 50 percent of the urokinase activity initially present in the input urine, which is an acceptable yield in any extraction process designed for the recovery of components present at extremely small concentrations in natural sources.

The final step in the purification method of this invention is the regeneration of urokinase from the urokinase-alkaloid-phosphorylated carbohydrate complex. It has been found that regeneration is readily effected by suspending the complex in aqueous acetone, adding concentrated hydrochloric acid and then, finally, adding acetone which results in the precipitation of urokinase from the solution. In the regeneration step, the alkaloid and phosphorylated carbohydrate moieties present in the complex remain in solution and thus are readily separated from the precipitated urokinase by decantation and centrifugation. This regeneration step may be applied either to the complex obtained directly from urine or to the purified complex after the solvent fractionation step described above.

In the regeneration step the complex is initially suspended at a concentration of about 5 to about 15 percent by weight in an aqueous acetone solution containing about 40 to about 60 percent acetone by volume. A 50 percent by volume aqueous acetone solution is generally preferred. The attainment of a uniform suspension of the complex is facilitated by homogenization.

The resulting uniform suspension is cooled to a temperature of −10° C. or less and then with vigorous and efficient agitation, sufficient hydrochloric acid, also at a temperature of −10° C. or less, is added, such that the resulting mixture attains a final normality of about 4 to about 6.5. To minimize the volume of the mixture, it is desirable that concentrated hydrochloric acid (12 N) be used. The rate of addition of the acid is adjusted such that the temperature of the mixture does not rise above −5° C. It has been found that a final acid normally of about 5 is generally preferred for optimum recovery of urokinase.

To the resulting solution is then added pre-cooled acetone at a temperature of −10° C. or less in an amount sufficient to raise the acetone concentration to at least 90 percent by volume. Upon the addition of acetone, a precipitate forms which is the desired urokinase free of the alkaloid and phosphorylated carbohydrate moieties. This precipitate, which settles rapidly, is separated from the liquid phase by decantation and centrifugation, and is washed free of residual acid with acetone. During the settling period, the centrifugation and washing operations, it is essential that the temperature of the solutions be maintained at −10° C. or less to minimize any activity loss which might be caused by the action of the strong acid medium upon the urokinase present.

Further purification is obtained by extracting the acetone-washed urokinase precipitate with water at a pH of at least 7.5, followed by precipitation of purified urokinase from the extract by the addition of acetone.

The urokinase product prepared in accordance with my invention generally has an activity of 100 to 250 urokinase units per milligram. Since normal urine has a urokinase activity of only about 5 to about 20 units per ml., it is apparent that the invention results in an extremely high degree of purification. Furthermore, the method is characterized by a relatively simple series of manipulative steps. The active fractions which precipitate at various stages of the process have excellent settling properties, which permits the removal of a much as 95 percent of the inactive mother liquors by simple decantation. Thus, the capacity of the centrifuges required in this method need be only relatively small, thus representing a marked improvement over urokinase extraction methods of the prior art where extremely large liquid volumes must be centrifuged. In spite of the simplicity of the method of this invention, significant activity yields are obtained.

Throughout the specification the term "urokinase units" refers to arbitrary units proportional to the ability of the material in question to destroy fibrin on a fibrin plate. Such an assay procedure is described by Plough et al., Biochim. Biophys. Acta, 24, 278 (1957).

The following example is included in order further to illustrate the present invention:

EXAMPLE

(a) Precipitation of Urokinase as a Complex 34.5 liters of human urine is collected over a 6 hour period in carboys packed in ice and the pH is then adjusted to 8.0 with 163 ml. 5 N NaOH. After standing overnight at 5° C., the clear supernatant liquid is decanted and an aliquot constituting 17.2 liters is placed in a flask equipped with a stirrer. The pH is adjusted to 5.0 with 111 ml. 5 N HCl and under vigorous and efficient stirring 1.7 liters of a 5 percent aqueous solution of quinine hydrochloride and 1.7 liters of a 3 percent aqueous solution of phosphorylated sucrose are added in succession. Agitation is continued for 10 minutes and the mixture is then allowed to stand overnight at a temperature of 5° C. The clear supernatant liquid, which is devoid of urokinase activity, is decanted and the residue which has a volume of about 1 liter is centrifuged. The precipitate is washed with 175 ml. of a 1 percent aqueous solution of quinine hydrochloride. The resulting washed precipitate constitutes a complex of urokinase with quinine hydrochloride and phosphorylated sucrose.

(b) Purification of the Complex by Solvent Fractionation

The washed precipitated complex obtained in step (a) is homogenized with 75 percent aqueous ethanol to yield a turbid, dark, reddish-brown colored solution. 258 ml. ethanol are added to adjust the water content to 25.5 percent by volume. The resulting suspension is transferred by use of 150 ml. of 75 percent aqueous ethanol to a flask equipped with a stirrer which is maintained in an ice bath. To the suspension which has a volume of 668 ml. under vigorous agitation is added an equal volume of ether and the precipitate formed is separated by centrifugation. The solids are washed three times with a mixture of a 1 percent aqueous quinine hydrochloride solution, ethanol and ether in the relative proportions of 1:3:4 and then washed with a 1:1 mixture of acetone and ether. The washed precipitate is dried under vacuum to yield a purified complex weighing 6.01 grams.

(c) Regeneration of Urokinase from the Purified Complex

The precipitate obtained in step (b) is homogenized with 69 ml. of 50 percent aqueous acetone. The resulting suspension is cooled to −20° C. and 56.5 ml. 12 N HCl also at −20° C. are added. The rate of addition is adjusted so that the temperature of the mixture never exceeds −15° C. To the clear solution are then added 924 ml. of acetone at a temperature of −20° C. The precipitate, which constitutes urokinase free of phosphorylated sucrose and quinine hydrochloride, is separated by decantation and centrifugation, washed with acetone with acetone and dried in a vacuum. The dried material is extracted with cold water at 2° C. and a pH of 8.5 and the residue reextracted with cold water at pH 11.7. The extracts are combined and the pH adjusted to 7.5. The mixture is clarified by centrifugation and the liquid phase added to 10 volumes of acetone at 0° C. The precipitate is separated, washed with acetone and dried in a vacuum to yield 703 milligrams of urokinase having an activity as measured by the fibrin plate method of 161 urokinase units per mg. The activity yield is 30 percent of activity present in the input urine.

While the method exemplified by the foregoing example includes the steps of complex precipitation, purification by solvent fractionation and regeneration, the solvent fractionation step may be omitted if desired. Thus, the complex obtained as a product of step (a) may be subjected directly to regeneration as described in step (c) without intermediate purification.

It is understood that the foregoing detailed description is given merely by way of illustration and that many variations may be made therein without departing from the spirit of my invention.

Having described my inventioin, what I desire to secure by Letters Patent is:

1. A method of recovering urokinase from urine which comprises adjusting the pH of mammalian urine to from about 4.5 to about 6.5, adding at least 0.3 percent by weight of the urine of a water soluble salt of an alkaloid selected from the group consisting of the cinchona and strychnine alkaloids and then adding at least 0.2 percent by weight of the urine of a phosphorylated carbohydrate, separating the precipitate which forms, suspending said precipitate in aqueous acetone containing about 40 to about 60 percent acetone by volume, adding hydrochloric acid to said suspension in an amount such that the final acid normality is about 4 to about 6.5, adding acetone in an amount sufficient to raise the acetone volume concentration to at least 90 percent, and recovering the precipitate constituting urokinase.

2. A method according to claim 1 wherein the precipitate formed upon the addition to said pH adjusted urine of said water soluble alkaloid salt and said phosphorylated carbohydrate is washed with an aqueous solution containing about 0.5 to about 2.5 percent by weight of said water soluble alkaloid salt prior to suspending said precipitate in said aqueous acetone.

3. A method according to claim 1 wherein said alkaloid is quinine and wherein said phosphorylated carbohydrate is a member selected from the group consisting of phosphorylated sucrose and phosphorylated raffinose.

4. A method according to claim 1 wherein said water soluble alkaloid salt is quinine hydrochloride and said phosphorylated carbohydrate is phosphorylated sucrose.

5. A method of recovering urokinase from urine which comprises adjusting the pH of mammalian urine to from about 4.5 to about 6.5, adding at least 0.3 percent by weight of the urine of quinine hydrochloride, and then adding at least 0.2 percent by weight of the urine of a member selected from the group consisting of phosphorylated sucrose and phosphorylated raffinose, the temperature of the mixture being maintained at less than about 10° C. during said additions, separating the precipitate which forms, washing said precipitate with an aqueous solution containing about 0.5 to about 2.5 percent by weight of quinine hydrochloride, suspending said washed precipitate in aqueous acetone containing about 40 to about 60 percent acetone by volume, adding hydrochloric acid to said suspension in an amount such that the final acid normality is about 4 to about 6.5 while maintaining the temperature of the mixture at less than −5° C., adding acetone in an amount sufficient to raise the acetone volume concentration to at least 90 percent, and recovering the precipitate constituting urokinase.

6. A method according to claim 5 wherein said member is phosphorylated sucrose.

7. A method of recovering urokinase from urine which comprises adjusting the pH of mammalian urine to about 5, then adding about 0.5 percent by weight of the urine of quinine hydrochloride and then adding about 0.3 percent by weight of the urine of phosphorylated sucrose, the temperature being maintained at less than about 10° C. during said additions, separating the precipitate which forms, washing said precipitate with an aqueous solution containing about 0.5 to about 2.5 percent by weight of quinine hydrochloride, suspending the washed precipitate in aqueous acetone containing about 50 percent acetone by volume, adding hydrochloric acid to the suspension of said washed precipitate in said aqueous acetone in an amount such that the final acid normality is about 5, while maintaining the temperature of the mixture at less than −5° C., adding acetone in an amount sufficient to raise the acetone volume concentration to at least 90 percent, and recovering the precipitate constituting urokinase.

8. A method of recovering urokinase from urine which comprises adjusting the pH of mammalian urine to about 4.5 to about 6.5, adding at least 0.3 percent by weight of the urine of a water soluble salt of an alkaloid selected from the group consisting of the cinchona and strychnine alkaloids and then adding at least 0.2 percent by weight of the urine of a phosphorylated carbohydrate, separating the precipitate which forms, suspending said precipitate in aqueous ethanol containing about 65 to about 80 percent ethanol by volume, adding to the resulting suspension about 0.5 to about 2 volumes of ether per volume of said suspension, separating the precipitate which forms, suspending said precipitate in aqueous acetone containing about 40 to about 60 percent acetone by volume, adding hydrochloric acid to the suspension in an amount such that the final acid normality is about 4 to about 6.5, adding acetone in an amount sufficient to raise the acetone volume concentration to at least 90 percent, and recovering the precipitate constituting urokinase.

9. A method of recovering urokinase from urine which comprises adjusting the pH of mammalian urine to about 4.5 to about 6.5, adding at least 0.3 percent by weight of the urine of quinine hydrochloride, and then adding at least 0.2 percent by weight of the urine of a member selected from the group consisting of phosphorylated sucrose and phosphorylated raffinose, the temperature of the mixture being maintained at less than about 10° C. during said additions, separating the precipitate which forms, washing said precipitate with an aqueous solution containing about 0.5 to about 2.5 percent by weight of quinine hydrochloride, suspending said washed precipitate in aqueous ethanol containing about 65 to about 80 percent ethanol by volume at a temperature of less than 10° C., adding to the resulting suspension about 0.5 to about 2 volumes of ether per volume of the suspension at a temperature of less than about 10° C., separating the precipitate which forms, suspending the precipitate in aqueous acetone containing about 40 to about 60 percent acetone by volume, adding hydrochloric acid to the suspension in an amount such that the final acid normality is about 4 to about 6.5 while maintaining the temperature of the mixture at less than −5° C., adding acetone in an amount sufficient to raise the acetone volume concentration to at least 90 percent, and recovering the precipitate constituting urokinase.

10. A method of recovering urokinase from urine which comprises adjusting the pH of mammalian urine to between 7.5 and 10, separating the precipitate which forms, adjusting the pH of the mother liquor to about 5, adding about 0.5 percent by weight of said mother liquor of quinine hydrochloride, and then adding about 0.3 percent by weight of said mother liquor of phosphorylated sucrose, the temperature of the mixture being maintained at less than about 10° C. during said additions, separating the precipitate which forms, washing the precipitate with an aqueous solution containing about 1 percent by weight of quinine hydrochloride, suspending the washed precipitate in aqueous ethanol containing about 75 percent ethanol by volume, adding to the resulting suspension about 1 volume of ether per volume of the suspension while maintaining the temperature at less than 10° C., separating the precipitate which forms, washing the precipitate with a solution of about 1 percent by weight of quinine hydrochloride in a solvent system containing water, ethanol and ether in the relative proportions of about 1 to 3 to 4, suspending the washed precipitate in aqueous acetone containing about 50 percent acetone by volume, adding hydrochloric acid to the suspension while maintaining the temperature at less than −5° C. in an amount such that the final acid normality is about 5, adding sufficient acetone to raise the acetone volume concentration to at least 90 percent, separating the precipitate which forms, extracting the precipitate with water at a pH of at least 7.5, adding sufficient acetone to the extract to raise the acetone volume concentration to at least 90 percent and recovering the precipitate constituting urokinase.

No references cited.